United States Patent [19]

Middleton et al.

[11] Patent Number: 4,528,424
[45] Date of Patent: Jul. 9, 1985

[54] MULTIPARTY LINE ADAPTER WITH PRIVACY FEATURE CONTROLLED BY REVERSAL OF LINE POLARITY AT A CENTRAL POWER SOURCE

[75] Inventors: Francisco A. Middleton, Sandy Hook; Santanu Das, Shelton; Franklin Hargrave, Newtown, all of Conn.

[73] Assignee: International Telephone and Telegraph Corporation, New York, N.Y.

[21] Appl. No.: 507,364

[22] Filed: Jun. 24, 1983

[51] Int. Cl.³ .................... H04M 1/70; H04M 3/16
[52] U.S. Cl. ........................... 179/17 A; 179/17 B; 179/17 D; 179/17 E; 179/99 E; 179/32; 179/35
[58] Field of Search ............... 179/17 R, 17 A, 17 B, 179/17 D, 17 E, 30–36, 99 E, 19, 18 FH, 84 UF

[56] References Cited
U.S. PATENT DOCUMENTS
3,688,050 8/1972 Goetchius et al. ............... 179/17 A

Primary Examiner—Stafford D. Schreyer
Attorney, Agent, or Firm—John T. O'Halloran; Jeffrey P. Morris

[57] ABSTRACT

A circuit for adapting a telephone subscriber line to operate as a multiparty line is described wherein a plurality of conventional single line subscriber subsets are provided telephone service on the subscriber line such that each subscriber has privacy at all stages of call progress. In accordance with another feature of the present invention, frequency selective ringing is not required to prevent ringing from occuring at other subscriber subsets on the multiparty line when a party is called. The circuit of the present invention controls the switching of battery polarity at the central office to connect and disconnect subscribers from the line. The invention further provides automatic telephone number identification when calls are initiated by varying a unique identity tone for billing purposes. The invention also uniquely provides for user transparent reverting calling such that no special dialing procedure is required to make reverting calls and complete privacy is maintained, even on reverting calls.

21 Claims, 4 Drawing Figures

MULTIPARTY LINE ADAPTER WITH PRIVACY FEATURE CONTROLLED BY REVERSAL OF LINE POLARITY AT A CENTRAL POWER SOURCE

BACKGROUND OF THE INVENTION

1. Field of the Invention

This invention relates generally to telephone party line systems wherein a plurality of individual telephone subscribers utilize the same telephone subscriber line, and more particularly to an improved telephone party line system which provides privacy of communication to each party line subscriber on all calls.

2. Description of the Prior Art

In many rural or other low user density environments, it is most economically advantageous to provide telephone party line systems in which two or more telephone subscribers share a single subscriber line. Such party line arrangements in the past have suffered from numerous disadvantages, such as lack of privacy among the telephone subscribers sharing the party line, the requirement for coded ringing, special calling procedures for reverting calls i.e. calls to another party on the line to prevent ring trip from occuring due to calling party being off hook.

Generally, telephone party line systems of the prior art operate on the basis of polarity and ground dependent signalling over one or two wires from the local or central telephone exchange which establish current paths to ground that are detected at the local or central telephone office for identification of the called party. Privacy among telephone subscribers sharing a party line in such a prior art system is achieved by dc polarity blockage which is commanded from the telephone exchange depending upon which party sharing the line is initiating or terminating a particular telephone call. The ringer at the subscriber set is activated by applying a ringing current between either one or both of the wires on the telephone line and ground. Other known arrangements of the prior art for applying ringing current across the ring and tip lines make use of a set of frequency selective ringers to identify the called party.

Examples of party line systems of the known prior art are illustrated by U.S. Pat. No. 3,668,050 "Telephone Set Identification System Using Reverse Polarity Interrogation Signal" which describes a telephone identification system in which telephones are equipped with circuits that are responsive to a reversal of the battery voltage for the central office to generate and transmit a preselected identification signal to the central office. The frequency of the identification signal is determined by connecting either a resistor-capacitor series circuit or a normally closed switch across a selected tap switch. U.S. Pat. No. 4,221,935 "Control Circuit for Telephone Subscriber Station" uses a microprocessor and external logic to provide automatic number identification, party line privacy, fully selected ringing, remote station verification and disconnect, and reverting calling. U.S. Pat. No. 4,149,040 "Identifier Circuit for Identifying Party Line Subscribers" describes an identifier circuit for identifying party line subscribers in which the line adaptors have a pair of terminals which may be selectively connected to ground. U.S. Pat. No. 3,035,123 "Party Line Telephone Circuit" describes a privacy system in a two-party line telephone circuit and also relies on the charging and discharging of a capacitor. U.S. Pat. No. 3,530,253 "Party Line Circuit Using Diodes in Ringing Control, Lockout and Revertive Calling" describes a party line system for secrecy and reverting calling in two-party stations. U.S. Pat. No. 4,293,737 "Ringing Decoder Circuit" describes a ringing decoder circuit for automatically ringing a single party on a multiparty telephone line. U.S. Pat. No. 3,297,270 "Automatic Number Identification Having Four-Party Detection" describes an automatic number identification system.

The aforementioned prior art references and other known party line communication systems of the prior art are generally unable to provide complete privacy between subscribers when more than two subscribers share the same party line. A further disadvantage of prior art party line systems is the requirement of special installation and ground signalling for identification of a called party with the associated requirement for specialized and complex circuitry at the telephone central office. The prior art technique of using frequency selective ringing circuitry for identification of the called party results in reliability, cost and maintainence problems which are eliminated by applicants' invention. Such prior art systems are particularly undesirable when reverting calls are initiated, i.e. a call between one subscriber on the party line to another subscriber on the same party line, since such reverting calls using known systems of the prior art require cumbersome dialing schemes having coded ringing to prevent parties other than the called party from being rung.

SUMMARY OF THE INVENTION

A circuit for adapting a telephone subscriber line to operate as a multiparty line is described wherein a plurality of conventional single line subscriber subsets are provided telephone service on the subscriber line such that each subscriber has privacy at all stages of call progress. In accordance with another feature of the present invention, frequency selective ringing is not required to prevent ringing from occuring at other subscriber subsets on the multiparty line when a party is called. The circuit of the present invention relies on the switching of battery polarity at the central office to connect and disconnect subscribers from the line during signalling. The invention further provides automatic telephone number identification when calls are initiated by varying a unique identity tone for billing purposes. The invention also uniquely provides for user transparent reverting calling such that no special dialing procedure is required to make reverting calls and complete privacy is maintained, even on reverting calls.

DESCRIPTION OF THE PREFERRED EMBODIMENT

Figure 1:
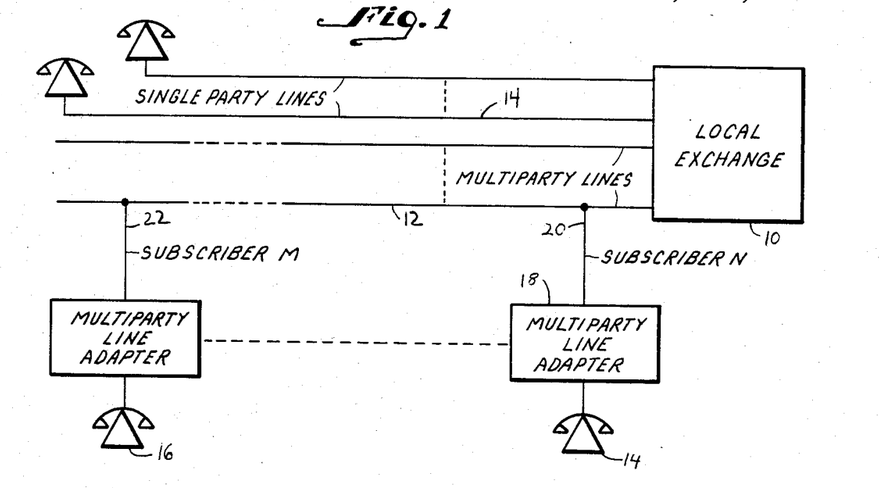
FIG. 1 illustrates a simplified block diagram of a telephone exchange incorporating applicants' multiparty line adaptor.

Referring now to FIG. 1, a simplified block diagram of a local or central telephone exchange incorporating applicants' multiparty line adaptor is illustrated. A local telephone exchange 10, such as an ITT 1240 Digital Exchange, has coupled thereto a plurality of telephone lines and trunks and provides switching and related telephone functions and services to such telephone lines, which lines may number from a few hundred to many thousands. The analog telephone subscriber lines and trunks are terminated at the exchange 10 by the telephone line circuits at the exchange which convert the analog telephone information into multichannel digital PCM format suitable for PCM switching; and then back to analog signals after switching for transmission back to the lines. It is sufficient for purposes of the present invention that at least some of the telephone subscriber lines serviced by local exchange 10 may comprise multiparty lines, such as multiparty line 12, while other serviced lines are single party subscriber lines such as line 14. The details of operation of a telephone switching system are well known, and reference may be made by way of example to U.S. Pat. No. 4,201,889 of A. Lawrence et al, assigned to the assignee of the present invention, entitled "Distributed Control Digital Switching System" for details of such a switching system. Similarly, reference may be made to U.S. Pat. No. 4,161,633 of R. Treiber entitled "Subscriber Line/Trunk Circuit" and to U.S. Pat. No. 4,317,916 of R. Chea entitled "Subscriber Line Interface Circuit Utilizing Impedance Synthesizer and Shared Voltage Source for Loop Current Regulation Control", for examples of telephone line circuits, which may be incorporated within the local exchange 10, and which, together with standard interface circuitry at the exchange, couples information from telephone lines to and from the exchange.

Multiparty line 12, which is one of a plurality of like multiparty lines, is coupled to a plurality of telephone subscribers N through M by their respective tip and ring lines. The subscribers M through N share the party line 12. Each of subscribers N through M accesses line 12 by its tip and ring lines from a conventional telephone subset, illustrated for subscriber N at 14 and for subscriber M at 16.

The multiparty adaptor circuitry 18 of the present invention is preferably incorporated into a module which can be interposed between the subsets 14 and 16 of subscribers N through M and the multiparty line. Of course, the multiparty line adaptor could also be built into the subset or multiple MLA could be built in a single chassis and connection to subsets N→M are directly from this shared chassis. The tip and ring lines from subscriber N subset 14 are shown illustratively as line 20 and the tip and ring lines from subscriber subset 16 are shown illustratively as line 22. The illustration of subscribers N and M is exemplary only, and it is to be understood that in accordance with priciples of the invention, a plurality of subscribers greater than or equal to two can share the line 12, each of such subscribers having a multiparty adaptor circuit 18 associated with his respective telephone subset. Thus, for ten partyline subscribers sharing line 12, subscriber M subset 16 would interface tip and ring lines 22 through multiparty adaptor circuit 24 of identical configuration as circuit 18 of subscriber 14, and the other eight party line subscribers would also each be similarly connected to line 12.

Figure 2:
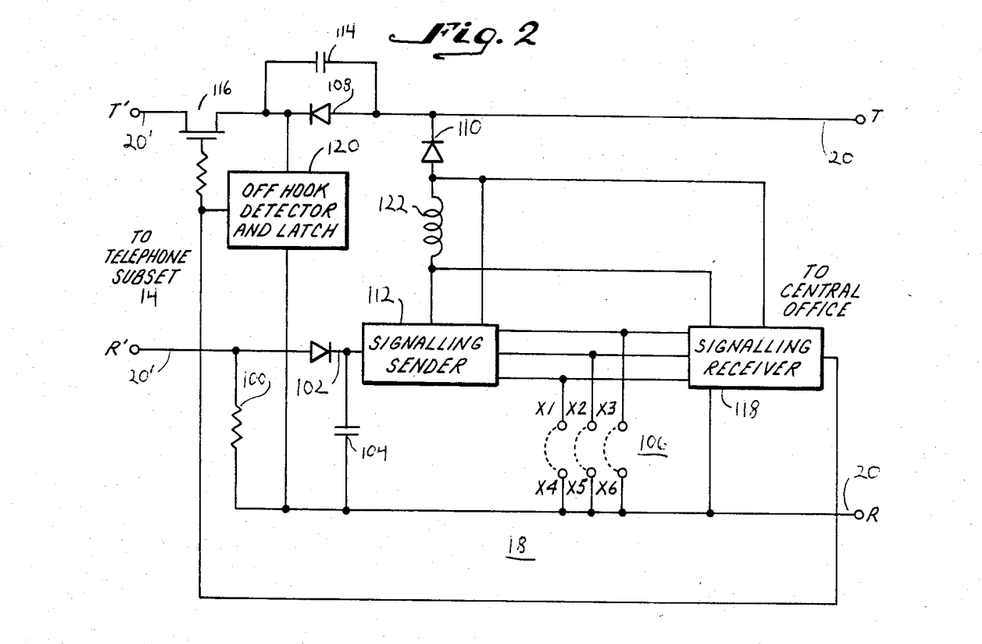
FIG. 2 illustrates a simplified block diagram of the operation of a multiparty line adaptor in accordance with the present invention.

Referring now to FIG. 2, a simplified block diagram illustrative of the operation of multiparty line adaptor 18 is shown for subscriber N on multiparty line 12. The following is a description of the operation of the circuit of FIG. 2 in connection with an originating call, a terminating call and a reverting call.

When the subset 14 of subscriber N is in the idle condition, there are no incoming or outgoing signals to or from subset 14 on tip and ring lines 20' (which designates the tip and ring lines between subset 14 and multiparty adaptor 18). The tip and ring lines between the multiparty adaptor 18 and the multiparty telephone line 12 are designated by 20. In the idle condition, the subset 14 is hung-up i.e. "on-hook". When the subscriber N subset 14 goes "off-hook", i.e. the telephone handset is lifted out of its cradle, a dc path is closed within the subset through tip and ring lines (T') and (R') via resistor 100 to complete the dc loop. The dc voltage, referred to as the battery voltage, is typically −48 volts. When the dc loop is closed, current flows through diode 102 into capacitor 104 and charges capacitor 104. Conventional detection circuitry at the telephone local exchange 10 detects that a subscriber on the line 12 has gone "off-hook" by sensing current flow in the line, and reverses the polarity on tip and ring lines (t) and (R) 20 to activate an identification sending unit 112, whose code is set by a group of switches X1, X2 . . . X6.

When polarity is reversed on Tip (T) and Ring (R) line 20, diode 108 stops the flow of current and diode 110 allows power to be delivered to a signalling sender 112, which may comprise a single frequency (SF), dual tone multifrequency (DTMF), or dial pulse (DP) transmitter.

Only one of the transmitters 112 sharing the line 12 will have its enable capacitor 104 charged up, which will enable the identification unit 112 to transmit the identification code of the individual subscriber going Off-Hook. The identification of each subscriber at 106 is provided by means of straps between the nodes labled X1, X2, X3, X4, X5 and X6, and will be described in greater detail in connection with FIGS. 3A and 3B.

The local or central office exchange 10 will receive the SF, DTMF, or dial pulse encoded identity of the subscriber from its multiparty line adaptor circuit 18 and once the subscriber identification has taken place, it will reverse the polarity of the line 12 back to a normal polarity, disabling in this manner the signalling portion of the adaptor circuit 18 and re-enabling the transmission path formed by diode 108, capacitor 114, transistor 116 and resistor 100.

In the event that a subscriber goes "off-hook" when a first subscriber (or subscribers) on line 12 are already in control of the line, i.e. have seized the line, an "off-hook" detector and latch 120 will identify that the voltage drop across Tip and Ring 20' is less than the −48 volts lowered by the low impedance presented by one or more of the telephone sets already in control of that line. The latch 120 will turn off transistor 116 preventing the second and subsequent subscribers from being serviced.

Ringing current is transmitted, in accordance with another aspect of the invention, only to the subscriber sharing line 12 who has been called, i.e. to the called party. Thus, all of the subsets sharing the line 12 do not ring whenever an individual subscriber is called. The central office equipment at the exchange 10 reverses the polarity of the line 12 just prior to applying each ringing pulse train. Assuming that subscriber N is the called party, and that the central office has just reversed the polarity of line 12, and consequently of tip and ring lines 20 prior to application of ringing, then diode 110 is forward biased. This allows signals to be delivered to a signalling receiver 118 (either SF, DTMF or dial pulse). The DTMF sender and the receiver are standard equipment with dual tone multifrequency type subsets, and reference may be made to Reference Data for Radio Engineers, Sixth Ed. 1975, Chapter 33-22 for a description of push-button multifrequency signalling; and to Basic Telephone Switching Systems, Second Ed. by David O'Talley, Hayden Book Co., 1979 at pages 15-24 for description of conventional circuitry involved in push-button and rotary dialing. After diode 110 is forward biased and power is coupled to signalling receiver 118, the telephone exchange 10 transmits a digitally encoded train of SF pulses (or DTMF or dial pulses, as the case may be) indicating the identity of the called party to which ringing current is to be applied.

The identity of the called party is once again given by the same straps X1 ... X6 at 106 that allow the identification for the transmitter 112. The selected (called) receiver will identify that it is the selected one and will enable (turn ON) the line switch transistor 116 to allow the flow of ringing current through it. The remaining receivers sharing the line at other subscriber locations will detect that they are not the selected ones and will maintain their respective line switch transistors 116 disabled (OFF) to block the flow of ringing current.

Ringing signal generation per se is a function of the local exchange 10, and the details of such ring signal generation are not necessary for an understanding of applicants' invention. However, reference may be made to U.S. Pat. No. 4,349,703 of R. Chea entitled "Programmable Ring Signal Generator", and assigned to the assignee of the present invention, for the details of a ringing circuit particularly suitable for use in digital communication systems having a digital switching exchange.

For a reverting call, wherein for example, subscriber N on party line 12 desires to call subscriber M on party-line 12, the same originating call and terminating call procedures are used.

As in the case of the terminating call previously described, all telephone subscriber sets on the multiparty line, including the calling subscriber, will be disabled preventing the flow of ringing current or dc current from the central office exchange 10 battery preventing at the same time that any subscriber on the line other than the called subscriber will generate a ring-trip signal at the central office exchange 10. A ring trip signal terminates ringing.

Upon detection of a ring-trip signal, the central office exchange 10 will re-implement the battery reversal sequence to activate the receivers 118 on the party line and will transmit enable and identification codes to both the called and calling subscribers, and will also return the polarity of the line 18 back to the normal polarity upon completion of the signalling sequence. This will allow the communication between the two subscribers M and N to proceed in a regular manner with the rest of the subscribers sharing the line 12 disabled or blocked from accessing the line 12.

The capacitor 114 across diode 108 permits ac ringing current to flow and minimizes distortion therein. The inductor 122 functions to prevent ac ringing current from flowing into the power terminals of the transmitter and receiver circuits 112 and 118 respectively. Inductor 122 is bypassed when either transmitter 112 or receiver 118 is in its respective transmit or receive signalling mode.

Figure 3A:
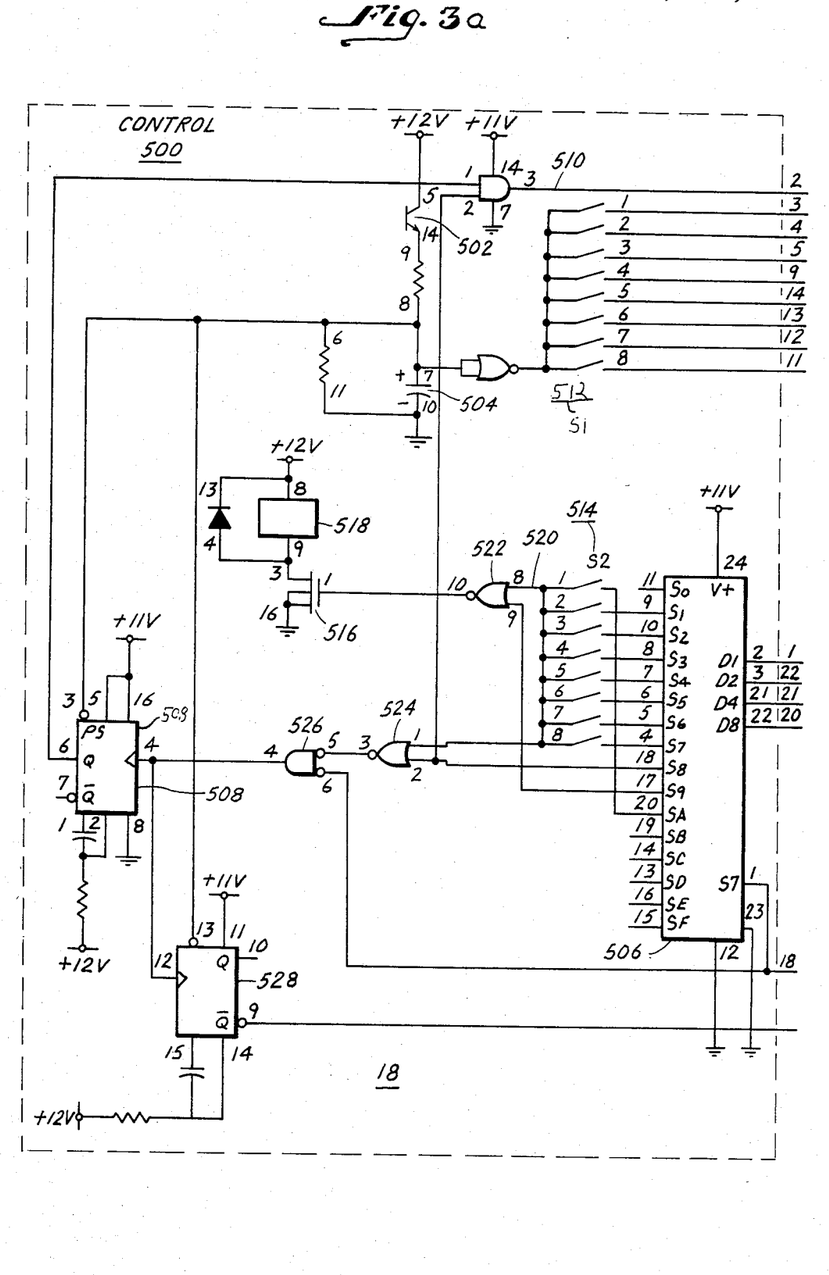
FIGS. 3A and 3B together is a schematic diagram of a preferred embodiment of the multiparty line adaptor described with reference to FIG. 2.
Figure 3B:
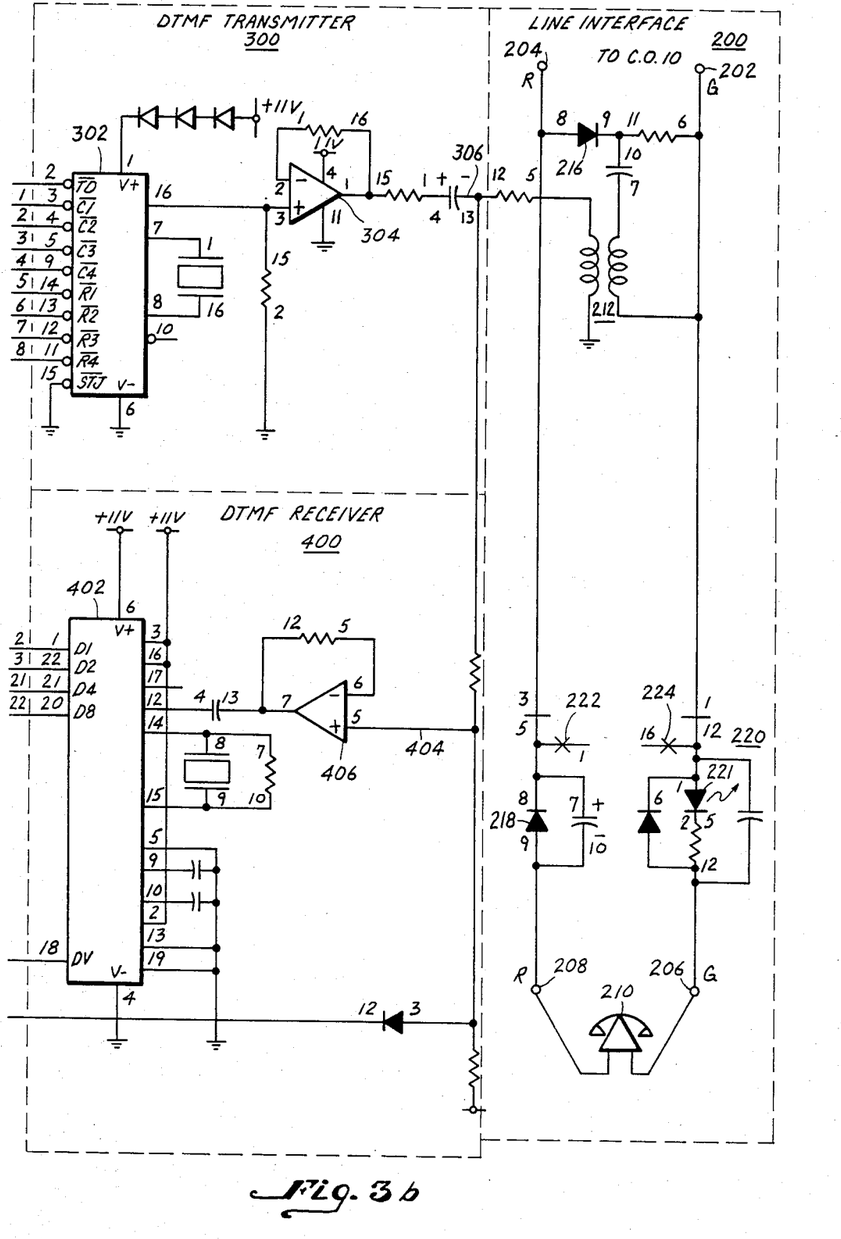

Referring now to FIGS. 3A and 3B, a detailed schematic of the multiparty line adaptor 18 described with reference to FIG. 2 will now be described. As described with reference to FIG. 1, the multiparty line adaptor is interposed in the transmission line tip and ring connection between subscriber line 12 and each of the party line subscriber subsets N through M, which may, for example, be ten in number on any one party line. Functionally, the multiparty line adaptor 18 includes line interface circuitry 200, DTMF signal transmission circuitry 300, DTMF signal receiving circuitry 400 and a control circuit 500.

Line interface circuit 200 provides a transmission path to the control or local exchange 10 via subscriber line 12, to which line interface 200 is coupled by tip (ground) and ring lines 202 and 204 respectively. A subscriber is thus connected either through the multiparty line adaptor 18 or direct to the tip and ring lines of the subscriber's subset. The local or central exchange 10 selects whether communication will be with the multiparty line adaptor or directly with the subscriber subset tip and ring lines. This is accomplished by the tip and ring line polarity reversal (battery reversal) at the exchange 10. In normal battery polarity, exchange 10 communicates directly with the subscriber tip and ring at 206 and 208 respectively, which permits the customer subscriber set 210 to be rung or for the customer to initiate telephone calls. In the reverse polarity, the customer subscriber set 210 is disconnected from the line 12 to the Central Office 10 and the multiparty line adaptor 18 is connected to line 12, thereby allowing the central office exchange 10 either to interrogate the line adaptor 18 status or to control its operation.

The signal transmitter 300 generates DTMF tones which identify the party going "off-hook". This is accomplished by a tone generator 302 which may comprise, for example, a MOSTEK Integrated Tone Dialer MK 5089 monolithic integrated circuit which uses a crystal reference to provide eight different audio sinusoidal frequencies which are mixed to provide tones suitable for DTMF telephone signalling amplified at amplifier 304 and transmitted on line 306 to the line interface circuit 200, where they are inductively coupled to tip and ring lines 202 and 204 via coil 212.

The signal receiver 400 receives identification tones from the telephone exchange 10 via line interface 200 and provides a logic signal from integrated DTMF receiver 402 to control circuit 500 for interpretation.

The control section 500 accepts logic signals from the signal receiver 400 and interprets them as one of several commands. One of the commands is to instruct the signal transmitter 300 to return the identification of the particular multiparty line adaptor which is "off-hook". A second command is to put the customer back on line. A third command is to put the customer in a privacy mode.

A polarity reversal on the line interface 200 causes diode 216 to conduct. Diode 216 corresponds to diode 110 of FIG. 2. This polarity reversal also causes diode 218 to block current. This disconnects the subset 210 from the tip and ring lines and connects the transmitter 300 and receiver 400 via transformer 212 to the line. When the Central Office is sending a signal, it is then coupled to receiver 400. When the transmitter 300 is sending, information is coupled through coil 212.

Normal current flow (normal battery voltage of −48V dc) is present when diode 218 is forward biased and subset 210 is "off-hook". An Off-Hook detector 220 detects current flow through light emitting diode 222. Detector 220 consists of a protective zener diode, a current limiter resistor and speech bypass capacitor. This detection turns ON photo-transistor 502 in the control 500, which charges up capacitor 504. This indicates that the subset 210 has gone "off-hook". The Central Office recognizes that the subscriber has gone "off-hook" by sensing current flow in tip and ring lines 202–204. The central office then does a battery reversal (−48V is put on tip line 202 instead of on ring line 204, as in the normal case). The central office now transmits Dual Tone Multifrequency (DTMF) signalling to the receiver 400 via line 404 to operational amplifier 406. The DTMF receiver chip 402 may comprise, for example, either a Silicon System Inc. DTMF part no. 3201 or an ITT Microsystems Integrated DTMF 3201 Receiver. The receiver chip 402 generates the binary representation of sixteen possible DTMF signalling states, which represents the command information from the central office.

This command information is coupled to control 500 via a decoder chip 506 (a binary-to-one-of-sixteen decoder), such as RCA decoder part no. 4514. The control circuit 500 interprets the decoded commands from decoder 506 and initiates designated functions. Examples of commands are:

(1) interrogate Multiparty Line Adaptor (MLA) for identity, i.e. which subscriber has gone "off-hook".

(2) select a particular MLA for communication from central office.

(3) reset MLA (a tone that forces the MLA into an idle condition when the subscriber is "on-hook".

The interrogation of an MLA for subscriber off-hook identity will now be described.

STEP 1—The central office recognizes that one of the subscribers 14 or 16 has gone off hook. The central office then reverses the polarity of line feeding current on the tip ring pair 12. All Multiline Line Adaptors (MLA) 18 or 24 are then able to receive commands and give response since diode 216 is now forward biased.

STEP 2—The central office now transmits an interrogate DTMF signal to all MLA's. This signal is coupled into all MLA's via diode 216 and transformer 212 to the DTMF receiver 400. There the signal is detected and converted to a logic signal and passed on to the control section 500. The interrogation signal from the central office will cause S8 (pin 18), for example, of decoder 506 to go high and S0 to S7 and S9 to SF to go low. Since neither input of gate 522 is high the output of this gate will be high which will turn on transistor 516 and relay 518. With the relay operated, contacts 222 and 224 are opened thus disconnecting the subscribers from the tip and ring pair and therefore providing privacy during the identification process.

STEP 3—At the end of the interrogation tone from the central office, a one-shot multivibrator 508 is triggered, causing line 510 to go to a logic high. The logic high state on capacitor 504 through switches 512 (capacitor 504 was charged to a logic high when the calling subscriber went off-hook) and the logic high on line 510 cause the DTMF transmitter 302 to send the identification signal of the calling subscriber to the central office. This identification signal is a DTMF tone pair which is transmitted to the central office through operational amplifier 304, via line 306 and transformer 212. The coding on switches 512 selects the DTMF tone pair which is transmitted.

STEP 4—This same identity tone is also received by receiver 402 via line 404, is converted to a binary code at receiver chip 402 in accordance with the normal operation of the aforementioned 3201 Integrated DTMF Receiver; is decoded at decoder 506 and is coupled out via one of the switches 514 to relay driver transistor 516 and then to relay 518.

STEP 5—Relay 518 in the MLA of the calling subscriber is now de-energized allowing contacts 222 and 224 to close, connecting the subscriber back on tip and ring pair 202–204. Privacy is maintained since the identification signal of the calling subscriber is not an identification of any of the other MLA's on the subscriber line, therefore all relays such as relay 518 will be energized in all MLA's except the calling subscriber which by opening contacts 222 and 224, which disconnects all excluded subscribers from the tip and ring pair.

STEP 6—The central office returns the battery voltage to normal polarity which disconnects the MLA from the tip and ring pair by reverse biasing diode 216 and reconnects the calling subscriber by forward biasing diode 218.

The selection of a particular MLA for communication from the central office will now be described.

STEP 1—The central office does a polarity reversal, which applies −48 vdc to terminal 202.

STEP 2—The central office then transmits the identification DTMF signal of the desired MLA to all MLA's. For MLA #1, the identification signal is #1 and switch 2 is closed; on MLA #2, the identification signal is #2 and switch 3 is closed, and so on. Hence, only one MLA will pass its code from decoder 506 to NOR gate 522. The output of NOR gate 522 deactivates relay 518, thereby connecting only the desired subscriber to the tip and ring pair. All other MLA's are still disconnected because their corresponding relays are energized causing contacts 222 and 224 to be open.

STEP 3—The central office returns to normal battery polarity (i.e. −48 V applied to terminal 204).

STEP 4—The central office applies ringing current to the tip and ring pair and only the called subscriber's subset rings - all other subsets are silent since they are disconnected from ringing current (i.e. contacts 222 and 224 are open).

STEP 5—The called subscriber goes OFF-HOOK. The central office trips ringing and establishes a voice path through the central office switch (as described, for example, in U.S. Pat. No. 4,201,891).

The reset MLA command sequence will now be described. This sequence at call termination.

STEP 1—At call termination, regardless of whether initiated by the calling or called party, the central office does a battery reversal.

STEP 2—The central office transmits the reset DTMF signal to all MLA's on the tip and ring pair. This signal is received and decoded by 402 and 506 respectively. The reset DTMF signal causes pin #17 of decoder 506 to go to a logic high and the output of gate 522 to go to a logic low on all MLA's. All relays 518 of all MLA's are now de-energized, thereby reconnecting all subscribers to the subscriber line 12.

STEP 3—The battery voltage is returned to normal polarity at central office.

A complete reverting call will now be described.

STEP 1—Subscriber 1 goes "off-hook". This condition is detected at the central office and at MLA #1 via photo-detector 222 and phototransistor 502. The off hook condition is recorded on capacitor 504.

STEP 2—The central office does a battery reversal

STEP 3—The central office transmits the interrogate DTMF signal. All MLA's relay's 518 are energized, thereby disconnecting all subscribers, and thereby starting a privacy condition.

STEP 4—At the end of the interrogate signal the MLA #1 transmits the DTMF identification signal to the central office which also de-energizes relay 518 of MLA 1. This signal is selected, for example, by contacts 1 and 5 of switch 512, which pins are coupled to tone generator 302 for enabling of transmission to the central office, and to DTMF receiver 402.

STEP 5—The central office returns battery to normal polarity. All subscribers but subscriber #1 are still disconnected.

STEP 6—Subscriber #1 dials another subscriber on the party line, for example, subscriber #3.

STEP 7—The central office recognizes subscriber #3 to be on same subscriber line pair (party line) by the standard digit translation mechanism at the central office STEP 8—The central office does a battery reversal.

STEP 9—The central office sends the DTMF identification signal #3. MLA #3 has pin 4 of switch 514 closed and therefore responds to the DTMF signal and de-energizes relay 518. All other MLA's (including MLA #1) do not respond to DTMF signal #3, hence their relays remain energized. The relay 518 of MLA #1 becomes energized.

STEP 10—The central office returns the battery voltage to normal polarity.

STEP 11—The central office applies ringing current and only the called party's subset rings—all other subsets are silent.

STEP 12—Subscriber #3 goes "off-hook", and the central office trips ringing.

STEP 13—The central office reverses battery polarity.

STEP 14—The central office first sends DTMF signal #1. MLA #1 receives and decodes the signal at receiver 402 and decoder 506 causing an enable signal to be generated at pin 9 of decoder 506. Since switch contact 2 of switch 514 is closed, this enable signal is coupled to relay 518 and through gates 524 and 526 to one-shot multivibrator 528. The Q output of 528 shorts the input of operational amplifier 406, disabling further DTMF signal recognition in DTMF receiver 402 for approximately 100 milliseconds. During this interval, the central office transmits DTMF identification signal #3. MLA #1 does not see DTMF signal #3 or any other signal because of the shorted input, therefore relay 518 of MLA #1 remains de-energized. In MLA #3 the identification tone is recognized in accordance with STEP 2 of the sequence described for selecting a particular MLA for communication from the central office.

STEP 15—The central office returns to normal polarity.

STEP 16—The central office provides battery voltage to the subscriber line without establishing a voice path through the switching network at the central office. Communication between subscribers #1 and #3 is now established with complete privacy.

STEP 17—When both subscribers (#1 and #3) return to the "on-hook" condition, the system is put into the idle state by applying a battery reversal at the central office and through the sequence described by STEPS 2 and 3 of the sequence described in reset MLA sequence.

While the present invention has been described in connection with a preferred embodiment thereof, it is to be understood that additional embodiments, modifications and applications which will become obvious to those skilled in the art are included written within the spirit and scope of the invention as set forth by the claims appended hereto.

We claim:

1. A multiparty line adaptor circuit for enabling a telephone subset to share a single subscriber line from a local or central office with one or more other subscriber subsets, each of said subsets having a similar multiparty line adaptor circuit associated therewith, each of said multiparty line adaptor circuits comprising:

means for detecting the flow of current in subscriber tip and ring lines when the subscriber goes off-hook;

means for detecting a polarity reversal on said tip and ring lines initiated by said flow of current;

signalling means enabled in response to said polarity reversal on said tip and ring lines for generating and coupling a unique identification signal to said tip and ring lines;

means for generating a signal and coupling said signal to said single subscriber line for enabling all of said multiparty line adaptor circuits sharing said subscriber line in response to said polarity reversal;

means for generating a signal and coupling said signal to said single subscriber line for disabling all said multiparty line adapter circuits in response to said polarity reversal;

signalling receiver means responsive to an interrogate signal to cause said multiparty line adaptor circuit to transmit a unique identification signal to the said subscriber line;

means responsive to said unique identification signal to enable said multiparty line adaptor circuit such that ringing current can be received from said subscriber line at said enabled multiparty line adaptor circuit, and such that none of said disabled multiparty line adaptor circuits receives said ringing current; and means for receiving said identification signals such that only the calling subscriber and the uniquely identified called subscriber are coupled to the subscriber line, and such that all other subscribers on said multiparty line are disabled and uncoupled thereby maintaining privacy of communication on said multiparty line between said calling and called subscriber.

2. A multiparty line adaptor circuit in accordance with claim 1 wherein said means for detecting the flow of current includes a line current detection means for detecting central or local office battery voltage; and switch means for coupling and decoupling said multiparty line adaptor circuit from said subscriber line in response to reversals in polarity of said battery voltage on said tip and ring lines.

3. A multiparty line adaptor circuit in accordance with claim 1 wherein said signalling receiver means includes a DTMF receiver for receiving identification tones; means for converting said tones into a digital representation of the received DTMF signalling states indicative of the identity of a designated subscriber.

4. A multiparty line adaptor circuit in accordance with claim 3 further including
    control means having a decoder for decoding the output of said digital representation of DTMF signalling states; and
    relay means selectively enabled and disabled by the output of said decoder for connecting said subscriber subset.

5. A multiparty line adaptor circuit in accordance with claim 4 wherein:
    said control means further includes means for selectively enabling said signalling sender means to generate an identity tone representative of a particular subscriber to be coupled to said subscriber line for communication.

6. A multiparty line adaptor circuit in accordance with claim 5 wherein:
    said control means further includes reset means for forcing said multiparty line adaptor circuit into an idle condition when the subscriber is "on-hook".

7. A multiparty line adaptor circuit in accordance with claim 1 wherein said signalling sender means comprises at DTMF transmitter.

8. A multiparty line adaptor circuit in accordance with claim 1 wherein said signalling sender means comprises a dial pulse transmitter and wherein said signalling receiver means comprises a dial pulse receiver.

9. In a shared subscriber line arrangement, a multiparty line adaptor circuit interposed between a subscriber subset and a central or local telephone exchange for enabling a plurality of subscribers to share a telephone subscriber line such that privacy is maintained at all call stages between the subscribers sharing the line, said circuit comprising:
    line interface means coupled to the subscriber tip and ring lines for providing a transmission path from the shared subscriber line selectively either directly to the subscriber subset or to a circuit path through said multiparty line adaptor circuit;
    signalling receiver means coupled to said line interface means for receiving subscriber identity signals from said subscriber line and for generating a digital logic code indicative of receipt of a particular identity signal, said code being coupled to a control means for interpretation by said control means;
    signal transmitter means coupled to said signalling receiver means responsive to the interpretation of said code by said control means for generating and transmitting a unique identity signal indicative of the identity of a subscriber; and
    control means for decoding said logic signal from said signalling receiver to generate a plurality of commands for selective enabling and disabling of said multiparty line adaptor circuit such that only calling and called parties have access to said subscriber line while a call is in progress.

10. In a shared subscriber line arrangement, a multiparty line adapter in accordance with claim 9, wherein:
    said line interface means includes a line current detection means for detecting that the subscriber subset has gone off-hook; and
    switch means for coupling and decoupling said multiparty line adaptor circuit from said subscriber line in response to reversals in polarity on said tip and ring lines.

11. In a shared subscriber line arrangement, a multiparty line adaptor circuit in accordance with claim 10 wherein said tones indicative of the identity of the subscriber going off-hook are utilized by said central or local office exchange to provide automatic number identification of the calling subscriber.

12. In a shared subscriber line arrangement, a multiparty line adaptor circuit in accordance with claim 9 wherein:
    said signalling receiver means includes a DTMF receiver for receiving identification tones from said line interface means and for converting said tones into a digital representation of the received DTMF signalling states indicative of the identity of a particular subscriber.

13. In a shared subscriber line arrangement, a multiparty line adaptor circuit in accordance with claim 9 wherein:
    said control means includes decoder means for decoding the output of said digital representation of DTMF signalling states; and
    relay means selectively enabled and disabled by the output of said decoding means for enabling said signal transmitter means to selectively generate DTMF tones indicative of the identity of the party going off-hook.

14. In a shared subscriber line arrangement, a multiparty line adapter circuit in accordance with claim 13 wherein:
    said control means further includes means for selectively enabling said signal transmitter means to generate an identity tone representative of a particular subscriber to be coupled to said subscriber line for communication.

15. In a shared subscriber line arrangement, a multiparty line adaptor circuit in accordance with claim 14 wherein:
    said control means further includes reset means for forcing said multiparty line adaptor circuit into an idle condition when the subscriber is on-hook.

16. In a shared subscriber line arrangement, a multiparty line adaptor circuit in accordance with claim 14 wherein said control means includes a microprocessor.

17. In a shared subscriber line arrangement, a multiparty line adaptor circuit in accordance with claim 9 wherein:
    said signal transmitter means comprises a DTMF transmitter.

18. In a shared subscriber line arrangement, a multiparty line adaptor circuit in accordance with claim 9 wherein said signal transmitter means comprises a dial pulse transmitter and wherein said signalling receiver means comprises a dial pulse receiver.

19. In a telephone communication system wherein a plurality of multiparty lines each having a plurality of individual subscribers sharing each subscriber line communicate with a central exchange through a multiparty line adaptor circuit, a method of implementing a reverting call comprising the steps of:
    STEP 1—detection at the central office of a calling subscriber going off-hook.
    STEP 2—performing a battery voltage reversal at the central office which disconnects all subscribers from the line and enables all multiparty line adaptor circuits;
    STEP 3—transmitting an interrogation signal from the central office to enable signal transmitters of all multiparty line adaptor circuits;
    STEP 4—transmission from the calling subscriber's multiparty line adaptor circuits of an identification signal to the central office for enabling transmission from the calling subscriber to the central office;

STEP 5—returning to normal the battery polarity at the central office to connect the calling subscriber to the subscriber line while maintaining all other subscribers in a disconnected condition from the subscriber line such that the calling subscriber can dial a called subscriber. The calling subscriber dials a called subscriber;

STEP 6—the central office recognizes the called subscriber to be on the calling subscriber line;

STEP 7—performance of a battery polarity reversal at the central office;

STEP 8—transmission of a dual tone multifrequency identification signal from the central office to the called subscriber, to establish a communication path between the central office and the called subscriber.

20. A method in accordance with claim 19 including the further steps of:

STEP 9—returning the battery polarity to normal; and

STEP 10—applying ringing current from the central office to the called party's subset such that all other subsets sharing the multiparty subscriber line are silent.

21. A method in accordance with claim 20 comprising the further steps of:

STEP 11—transmitting of DTMF signals such that the called subscriber multiparty line adaptor circuit recognizes said signal and connects the subscriber to the subscriber line; and STEP 12—establishing communication between calling and called subscribers with complete privacy since all other subscribers sharing said multiparty line are disconnected from said line.

* * * * *